INVENTOR
Robert J. Sullivan

United States Patent Office 3,422,276
Patented Jan. 14, 1969

3,422,276
LOAD COMPUTING AND SHEDDING APPARATUS
HAVING SELF-ADJUSTING BANDWIDTH
Robert J. Sullivan, Wayne, N.J., assignor to Westinghouse Electric Corporation, Pittsburgh, Pa., a corporation of Pennsylvania
Filed June 30, 1966, Ser. No. 562,014
U.S. Cl. 307—29        7 Claims
Int. Cl. H02j 1/10; H02j 3/00

The present invention relates to load computing and shedding apparatus and, more particularly, to load computing and shedding apparatus for selectively and preferentially shedding loads as a function of the loads being supplied to a local system in case of utility power failure.

Industrial and municipal users of electrical power often maintain local power generating facilities to augment electrical power supplied by an external utility source. If a utility power failure should occur, the local generating capacity is usually exceeded which necessitates a portion of the loads being supplied locally being dropped from the user's system. This is required in order to avoid damage to the local generating facility and also to prevent the complete failure of power within the user's system. When it is necessary to drop certain loads from a user's system, it is highly desirable to be capable of selecting the loads to be shed in a given preferential order. For example in a municipal power distribution system, it is desirable that power feeders supplying hospitals be saved while shedding domestic power feeders in case of a utility power failure. In industrial systems, it would be desirable to save power line feeders from being shed which might cause injury to personnel and equipment while feeders of lesser priority such as lighting and cooling power feeders could be shed without damage.

Copending application Ser. No. 302,415, filed Aug. 15, 1963, now Patent 3,300,648, issued Aug. 15, 1963, and assigned to the same assignee as the present invention describes a system which permits the preferential selection of loads to be shed in case of utility power line failure. The system disclosed in the cited copending application compares the excess local power capacity with the amount of power required in the various circuits of the local system, and in response to this comparison, presets in a preferential manner, the various feeder circuits to be dropped from the system in case of a utility power failure. The comparison of the excess capacity and local power consumption is done on the basis of a fixed difference in power magnitude of these quantities; that is, on the basis of a fixed bandwidth of power which is necessary to preset a given feeder circuit from being shed from the system. In a fixed bandwidth system, it is necessary that the power bandwidth be set to be greater than the largest feeder being supplied. Otherwise, if the bandwidth is set at a lower value, the system will hunt, with the relays which preset which feeders are to be shed from the system being inserted into and out of the system. For instance, with the power bandwidth being so selected—for example 100 kilowatts—it would necessitate that a feeder or feeders drawing at least 100 kilowatts of power be preset to be shed in case of a power line failure. With such a fixed bandwidth of power, in many instances it is necessary to preset more feeder loads to be dropped than would otherwise be necessary if the number of feeder loads to be shed was based upon the actual power being supplied to the feeder loads. In other words, the presetting of a feeder drawing only 20 kilowatts of power might be sufficient to protect the local generating system in case of a utility power failure. However, at least 80 kilowatts more of feeder line consumption must be preset to satisfy the fixed 100 kilowatt bandwidth requirement.

It is therefore an object of the present invention to provide new and improved load computing and shedding apparatus capable of shedding loads from a local system in response to the amount of power supplied to these loads.

It is a further object of the present invention to provide new and improved load computing and shedding apparatus wherein a minimum number of local loads will be shed in case of a utility power failure.

It is a further object to provide new and improved load computing and shedding apparatus wherein local loads to be shed, in case of a utility failure are preferentially selected to be shed, with the loads being selected in response to the power being supplied to the various loads rather than on the basis of a predetermined amount of power.

Broadly, the present invention provides load computing and shedding apparatus in which the power supplied to preferentially determined local loads is sampled and compared with the local power supplying capability. In response to the amount of power being supplied to various loads, selected loads are preset to be dropped from the local system in case of a power line utility power failure. The apparatus reaches a balance point when the last load power sampled causes this load alternately to be preset to be dropped when sampled and to be saved when not sampled.

These and other objects and advantages of the present invention will become more apparent when considered in view of the following specification and drawings in which.

Figure 1:
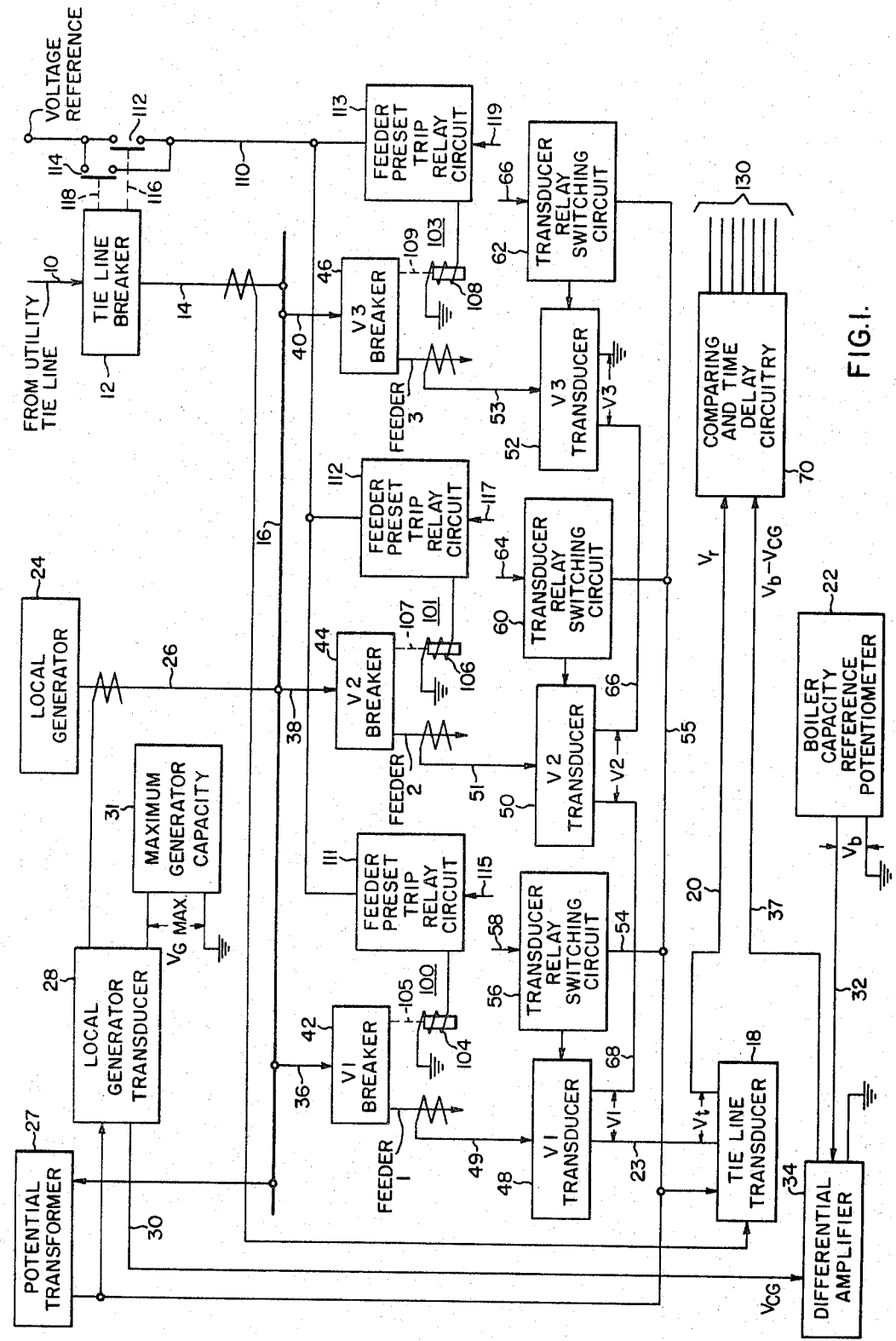
FIGURE 1 is a block diagram of the load computing and shedding apparatus of the present invention.

Referring now to FIG. 1, a local power distributing system is shown including a plurality of local feeder circuits. In the diagram, feeder 1, feeder 2 and feeder 3 are only shown; however, of course, many other feeder circuits could also be incorporated into the local system. External power is supplied into the local system from a utility tie line 10. A tie line breaker 12 is provided to permit power to pass from the utility tie line 10 to an output bus 14 into a local system bus 16. The tie line breaker 12 is normally in a closed position to permit the passage of power therethrough. The tie line breaker 12, however, will operate to open the circuit between the utility tie line 10 and the output bus 14 in case of a utility power failure. Also, the tie line breaker 12 may be opened manually if desired.

To measure the power being supplied by the utility tie line 10, a tie line transducer 18 is provided having a current input thereto supplied from an input inductively coupled to the output bus 14. The voltage input to the tie line transducer 18 is supplied from a potential transformer 27 which is supplied from an input connection from the local system bus 16. The tie line transducer 18 may comprise a watt transducer which has an output voltage $V_t$, as shown, which is indicative of the power being supplied by the utility tie line.

A local generator 24 supplies power through an output bus 26 to the local system bus 16. A local generator transducer 28 is provided to measure the power being supplied by the local generator 24. The local generator transducer 28 may comprise a watt transducer and has as its current input an input which is inductively coupled to the output bus 26. The voltage input to the local generator transducer 28 is provided by the potential transformer 27. The local generator transducer 28 provides an output voltage $V_g$ which is indicative of the power being supplied by the local generator 24. Only one local generator 28 is shown, however, others could, of course, be utilized in the system. The output voltage $V_g$ of the local generator transducer 28 is developed between lead 29 and an output lead 30. A generator maximum capacity reference potentiometer 31 is provided which supplies an output voltage $V_{G\ max}$ which is indicative of a maximum safe power capacity that the local generator 24 can supply continuously without damage. The voltage $V_{G\ max}$ is developed between ground and a lead 29. The voltage from lead 30 to ground is then $V_{G\ max} - V_g = V_{GC}$. $V_{CG}$ is then the capability of the generator to pick up additional load. A boiler capacity reference potentiometer 22 supplies an output $V_b$ between lead 32 and ground which is proportional to the boiler's capability to pick up additional load. The generator and boiler capabilities are then compared in the differential amplifier 34. The lower capability is then selected and connected to lead 36 as the local generating pick up capability $V_b - V_{CG}$.

The three feeder lines which are shown, feeder 1, feeder 2 and feeder 3, are supplied by the local system bus 16. Input connections 36, 38 and 40 connect the local system bus 16, respectively, through a V1 breaker 42, a V2 breaker 44 and a V3 breaker 46 to feeder 1, feeder 2 and feeder 3. The breakers 42, 44 and 46 are normally closed and permit power to pass from the local system bus 16 into the respective feeder circuits.

In order to provide a measure of the power being supplied to the loads in each of the feeders, feeder 1, feeder 2 and feeder 3, the respective transducers indicated as a V1 transducer 48, a V2 transducer 50 and a V3 transducer 52 are provided. A current input connection 49 is provided for the V1 transducer 48 inductively coupled to the feeder 1. Input current connections 51 and 53 are respectively inductively coupled to feeders 2 and 3 and are applied to the V2 transducer 50 and the V3 transducer 52 to supply the current inputs thereto. Transducers 48, 50 and 52 may, for example, comprise watt transducers. The voltage input to the transducers 48, 50 and 52 are provided from the potential transformer 27 through a lead 55. Connected between the lead 55 and the voltage input of the V1 transducer 48 is a transducer switching relay circuit 56 which in its closed position will permit voltage from the line 55 to be applied to the V1 transducer 48, and in its open position will block this voltage from being applied thereto. An input 58 is provided to the transducer switching relay circuit 56 to control its open or closed state. A transducer switching relay circuit 60 is connected between the line 55 and the voltage input of the V2 transducer 50, and a transducer switching relay circuit 62 is connected between the line 55 and the voltage input of the V3 transducer 52. The switching relay circuits 60 and 62 have inputs 64 and 66, respectively, to control the conductive state, the open or closed state, of the switching relay circuits 60 and 62 similarly to that of the switching relay circuit 56. The switching relay circuits 56, 60 and 62 are controlled via their respective inputs to determine which of the ouputs of the respective transducers are to be sampled.

The output voltages V1, V2 and V3 of the transducers 48, 50 and 52, respectively, are indicative of the amount of power being supplied to the respective feeders, feeder 1, feeder 2 and feeder 3. The voltages V1, V2 and V3 will be developed only when the corresponding transducer switching circuits 56, 60 and 62 are closed to supply a voltage input to the respective transducers. The outputs of the transducers 48, 50 and 52 are connected in series, with one end of the V3 transducer 52 being grounded and the other end connected to the V2 transducer 50 via a lead 66; the other output of the V2 transducer 50 is connected to one end of the V1 transducer 48 via a lead 68; the other output lead of the transducer 48 is connected to the tie line transducer through a lead 23. The voltages V1, V2 and V3 are so coupled to the output voltage $V_t$ of the tie line transducer 18 that the resulting voltage $V_r$ appearing on the lead 20 at the output of the tile line transducer with respect to ground may be defined according to the equation:

$$V_r = V_t - V_n$$

where $V_n = V1$, or $V1 + V2$, or $V1 + V2 + V3$, depending upon which of the transducers 48, 50 and 52 are providing an output in response to the closing of the transducer switching circuits 56, 60 and 62.

The voltage $V_r$, indicative of the difference between the power being supplied by the tie line 10, and the amount of power being programmed to be shed in the various feeders, feeder 1, feeder 2 or feeder 3, is applied to a comparing and time delay circuitry 70 through the lead 20 thereto. The other input to the comparing and time delay circuitry is the output of the differential amplifier 34 which is equal to the voltages $V_b - V_{CG}$, or in other words, the excess local system capacity that can be picked up by the local generator 24 in case of loss of the utility tie line power. A comparison of the voltage $V_r$ with the voltage $V_b - V_{CG}$ determines how many of the feeders, feeder 1, feeder 2 or feeder 3 are to be shed from the local system in case of the line power interruption. The functioning of the comparing and time delay circuitry 70 will be described in further detail below.

In the usual case, if a utility tie line failure should occur, it will be necessary that certain of the feeder loads be shed from the local system. Ideally, the most critical load will be saved until last from being shed from the system, while the most expendable load will be dropped from the local system upon tie line power interruption. Such a priority is shown in the present apparatus with the feeder 1 being set to shed first. The feeder 2 second, etc., in case of a utility tie line failure and insufficient local excess capacity.

In order for the feeder circuits 1, 2 and 3 to be shed from the local system in case of tie line power failure, it is necessary that the V1 breaker 42, the V2 breaker 44 or the V3 breaker 46 be preset to open in case of such a failure and thereby drop its associated load from the local system. A trip relay 100 is provided to open the V1 breaker 42. The trip relay 100 includes a coil 104 and a mechanical connection 105 to the V1 breaker 42. Upon the energization of the coil 104, the V1 breaker 42 will be open to drop the feeder 1 from the local system. The V2 breaker 44 includes a relay 101 which has a coil 106 which upon energization will open the V1 breaker 44 via a mechanical connection 107 thereto. The V3 breaker 46 has associated therewith a trip relay 103 having a coil 108 and a mechanical connection 109 to the V3 breaker 46 so that upon the energization of the coil 108, the V3 breaker 46 will be opened. One end of each of the coils 104, 106 and 108 is connected to ground. A feeder preset trip relay circuit 111 is connected between the ungrounded end of the coil 104 and a lead 110. The ungrounded end of the coil 106 is connected through a preset switching relay circuit 112 to the lead 110, and a feeder preset trip circuit 113 is connected between the ungrounded end of the coil 108 and the lead 110. The feeder preset trip relay circuits 111, 112 and 113 have inputs 115, 117 and 119, respectively, which control the open and closed condition of the relay circuit. The closed position of the feeder preset relay circuits will define that a given one of the feeders, feeder 1, feeder 3 or feeder 3 is preset to be dropped from the system in case of a utility power failure.

The lead 110 is connected to a parallel combination of normally open contacts 112 and 114. The other end of the contacts 112 and 114 are connected to a source of reference potential, which may be DC, not shown. The contacts 112 are the fault sensing contacts of the system. When a fault occurs in a utility tie line, the contacts 112, which are normally open, close to provide a conductive path between the reference source to the lead 110. By the closing of the contacts 112, the tie line breaker 12 is tripped to open and block the passage of power therethrough. A mechanical connection 116 is shown by the dotted line between the contacts 112 and the tie line breaker 12 to effect the tripping of the breaker 12. The other set of contacts 114 is an auxiliary set which is normally open when the tie line breaker is closed and closed when the tie line breaker 12 is open. Should the tie line breaker 12 open due to failure on the utility tie line or due to the manual opening of the tie line breaker 12, the contacts 114 will close. The contacts 114 are mechanically connected to the tie line breaker as indicated by a dotted line 118. The closing of either of the contacts 112 or 114 will provide a conductive path from the reference source to the respective ones of the feeder preset trip relay circuits 111, 112 or 113, and depending upon which of the switching circuits have been preset, the trip coils 104, 106 or 108 will be energized to trip the respective breakers 42, 44 and 46 and drop the associated feeder from the local system.

The open or closed position of the transducer switching circuits 56, 60 and 62 and the feeder preset circuits 111, 112 and 113 are controlled by the comparing and time delay circuitry 70 which has a plurality of output leads indicated generally by the bracketed outputs 130. These outputs are selectively applied to the respective inputs of the transducer switches and the feeder preset trip relay circuits as will now be explained.

Figure 2:
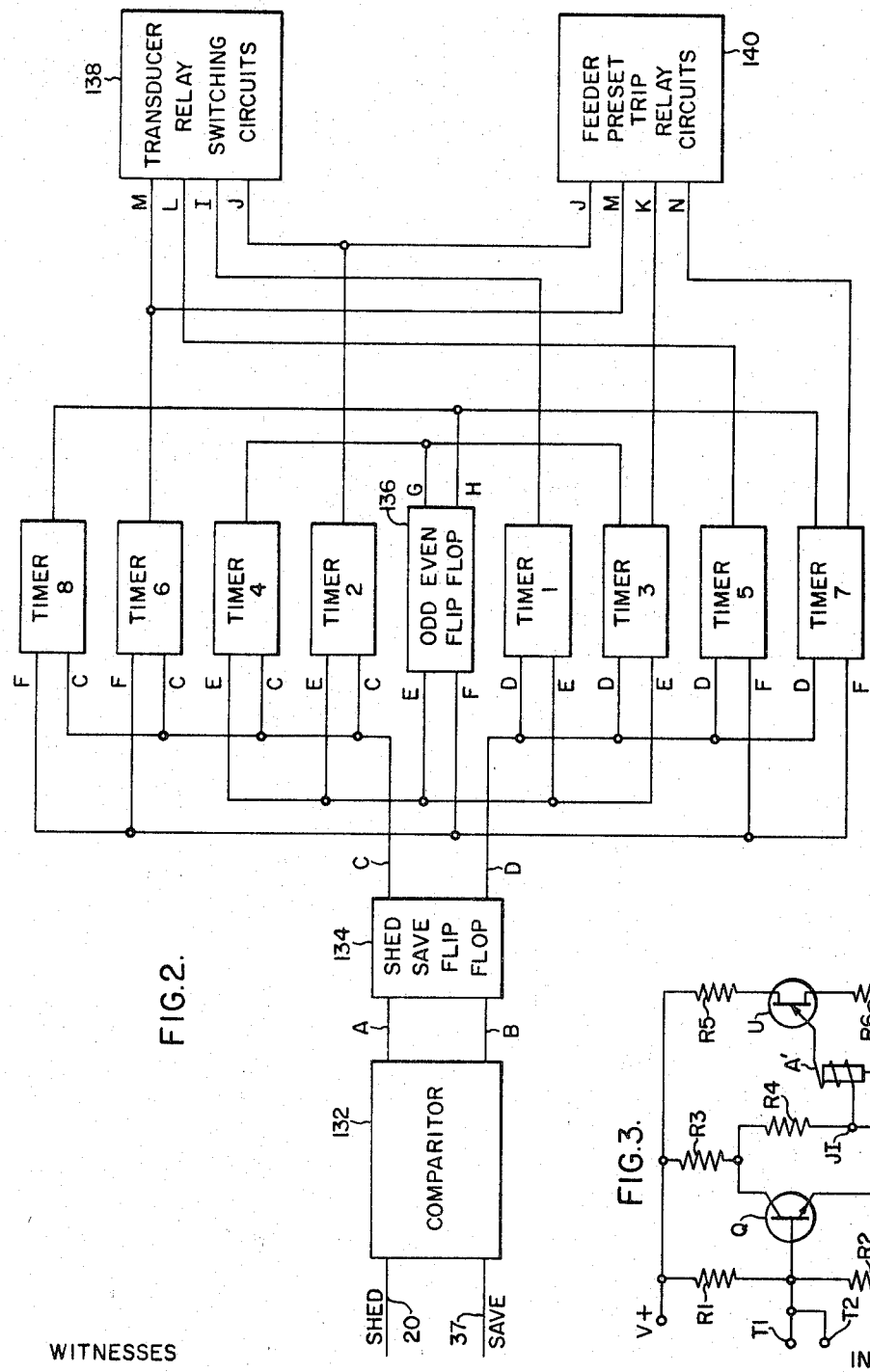
FIG. 2 is a block diagram of the comparing and time delay circuitry as utilized herein.

FIG. 2 shows a block diagram reduced to individual functional blocks of the comparing, and time delay circuitry 70 of FIG. 1. Voltages appearing on the leads 20 and 37 are applied to a comparator circuit 132. If the magnitude of the voltage appearing at the lead 20 is more positive than the magnitude of the voltage appearing at the lead 37, a "shed" condition will exist in the circuit. That is, it will be necessary that additional feeders be preset to be dropped from the local system if a utility tie line failure should occur. Conversely, if the "save" lead 37 should be more positive than the "shed" lead 20, feeder circuits that had previously been set to be dropped in case of a utility failure, may be kept in the circuit and be reset to be saved in case of a utility power failure. The comparator circuit 132 may, for example, comprise a magnetic amplifier and is so designed to produce a positive output at a lead A with respect to lead B whenever a "shed" condition exists, with lead 20 positive with respect to lead 37. Conversely, if a "save" condition exists, with lead 37 positive with respect to lead 20, the comparator circuit 132 will provide a positive output at the lead B with respect to lead A. The output from the leads A and B is applied to a shed-save flip-flop 134. The shed-save flip-flop 134 has outputs developed at leads C and D and is so designed to provide outputs at these leads in response to the input being applied at the leads A and B. If positive input signal is applied at lead A, an output will be provided at the lead D of the shed-save flip-flop 134 and no output will be provided at the lead C. Conversely, if an input signal appears at the lead B, an output will be provided at the lead C and no output at the lead D. The output appearing at the lead D is applied to four timing circuits designated by odd numbers as timer 1, timer 3, timer 5 and timer 7. The output appearing at lead C is applied to four even numbered timer circuits designated timer 2, timer 4, timer 6 and timer 8. The odd numbered timers 1, 3, 5 and 7 may be designated as "save" timers, and the even numbered timers 2, 4, 6 and 8 may be designated as "shed" timers.

Each of the timers 1 through 8 has another input applied thereto. An odd-even flip-flop 136 is provided which has output leads E and F which are applied as other inputs of the timers 1 through 8. The output lead E of the odd-even flip-flop 136 is applied as an input to timers 2, 4, 1 and 3, and the output F is applied to timers 5, 7, 6 and 8. The timer circuits 1 through 8 are designed to be inoperative if an input signal is applied at either of their input leads. Thus, if an input signal is applied to any of the timers 1 through 8, it will be inoperative and will provide no output therefrom. If, however, no input is applied to both of the inputs of any of the timers 1 through 8, an output signal will be provided therefrom after a predetermined time. That is, with no input signal being applied to a given timer, it will time out after a predetermined time to provide an output signal therefrom.

Timers 3 and 4 have their outputs commonly connected to a lead G which is connected as an input to the odd-even flip-flop 136. Timers 7 and 8 have an output commonly connected to a lead 8 which is connected at the other input to the odd-even flip-flop 136. The odd-even flip-flop 136 is operative to change its stable state in response to inputs being applied to the input leads G or H. According to the connection shown in FIG. 2, whenever timers 3 or 4 time out, a signal will be applied to the lead G and whenever timers 7 or 8 time out, an output signal will be applied to the lead H.

The various transducer relay switching circuits corresponding to those of 56, 60 and 62 in FIG. 1, are shown schematically as a block 138 in FIG. 2. The feeder preset trip relay circuits designated in FIG. 1 as 111, 112 and 113 are shown schematically by the block 140 in FIG. 2. The timer 1 provides an input to the transducer relay switching circuits 138 via a lead I. The timer 2 provides an input to both the transducer relay switching circuits 138 and the feeder preset trip relay circuits 140 via an output lead J. The timer 3 through a second output lead K provides an input to the feeder preset trip relay circuits 140. The timer 5 via a lead L provides an input to the transducer circuits 138; the timer 6 via a lead M provides an input to the transducer switching circuits 138 and to the feeder preset trip circuits 140. The timer 7 through its second output via a lead N provides an input to the feeder preset trip circuits 140. By the interconnections of the timers 1 through 8, the transducer switching circuits feeder preset trip relay circuits 140, the odd-even flip-flop 136, the comparator 132 and the shed-save flip-flop 134, as described in FIG. 2, may be controlled to accomplish the shedding and saving of the various feeder circuits as shown in FIG. 1. It is to be understood that FIG. 2 is merely diagrammatic of the circuit configuration and is used to aid in the understanding of the operation of the circuitry embodied therein.

Figure 3:
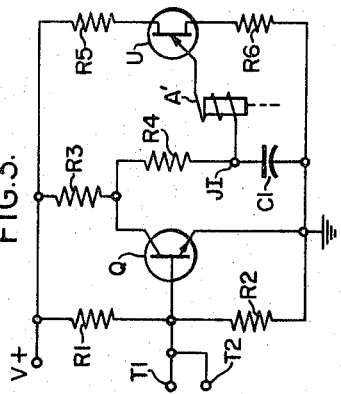
FIG. 3 is a schematic diagram of a timer circuit as utilized herein.

FIG. 3 shows a schematic diagram of a timing circuit which could be utilized as one of the timers 1 through 8 as shown in FIG. 2. As previously mentioned, the timer circuit is intended to be inoperative if an input signal is applied thereto, and is to time out to provide an output signal therefrom whenever no input signal is applied thereto. FIG. 3 shows a timing circuit in which a transistor Q is utilized. The application of a positive polarity with respect to ground input signals to either of the terminals T1 or T2, which are connected to the base of the transistor Q, will render the transistor Q conductive. The transistor is biased by a resistor R1 being connected between the base thereof and a terminal V+ to which a source of direct operating potential is to be applied and a resistor R2 connected between the base and ground. The emitter of the transistor Q is grounded. A resistor R3 is connected between the collector and the V+ terminal to supply operating potential to the transistor Q. A series connection of the resistor R4 and a capacitor C1 is connected between the collector and the emitter electrodes of the transistor Q. A junction J1 is formed between the capacitor C1 and the resistor R4. With the transistor Q1 in its conductive state, the capacitor C1 will not be permitted to charge, thereby maintaining the potential appearing at the junction J1 with respect to ground at a relatively low value. However, if no input signal is applied to both of the input terminals T1 and T2, the transistor Q will be rendered nonconductive so that the capacitor C1 may charge from V+ terminal through the resistors R3 and R4. The timing rate of the capacitor C1 will depend upon the RC time constant of the values C1, R3 and R4. A relay coil A' is connected between the junction J1 and the base electrode of a unijunction transistor U. A resistor R5 is connected between one output electrode of the unijunction transistor U and the V+ terminal and a resistor R6 is connected between the other output electrode and ground.

Presuming that the transistor Q is nonconductive due to the output and input signals of terminal T1 and T2, the capacitor C1 will begin to charge, and after a predetermined time, a voltage will be reached at the junction J1 which will be large enough to cause the unijunction transistor U1, which is normally nonconductive between its output electrodes, to become conductive therebetween. The firing of the unijunction transistor U will cause the capacitor C1 to discharge through the coil A' and the output electrode of the unijunction transistor U thereby energizing the coil A' with a pulse of current. It thus can be seen that a predetermined time after input signals have been removed from the base of the transistor Q that a coil A' having a pulse of energizing current applied thereto perform a predetermined opening or closing of contacts of a relay associated with the relay coil A'. The relay associated with the coil A' may be of the reed type designed for the rapid closing and opening or vice versa of contacts in response to a pulse current. That is, a pulse of current to the coil will cause a set of normally open contacts to close during the duration of the pulse and then reopen at the termination of the pulse. For a set of normally closed contacts the contacts would open in response to the pulse and then reclose.

The timing circuits 1 through 8 are so designed that the timer 2 will time out in one-half the time required for the timer 4 to time out; the timer 6 will time out in one-half the time required for the timer 8 to time out; the timer 1 will time out in one-half the time required for the timer 3 to time out; and the timer 5 will time out in one-half the time required for the timer 7 to time out. The difference in time out times may be accomplished through the selection of the RC timing circuits of the individual timers.

Figure 4:
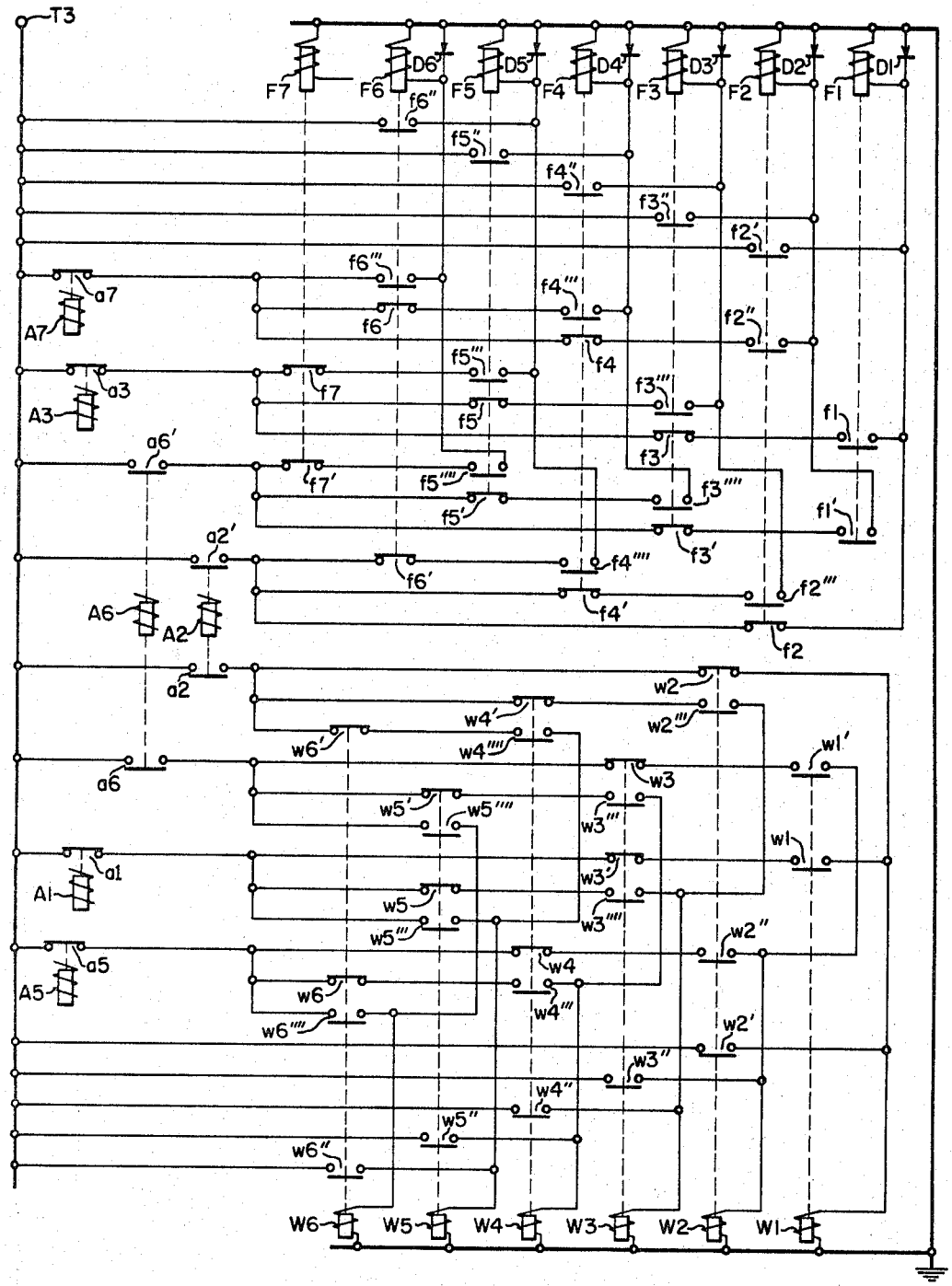
FIG. 4 is a schematic diagram of relay and switching circuitry as utilized herein.

Referring now to FIG. 4 as well as FIG. 2, the operation of the present invention will be explained in further detail. Timers 1, 2, 3, 5, 6 and 7 have corresponding timer relay coils A1, A2, A3, A5, A6 and A7, as shown in FIG. 4, which operate the correspondingly designated contacts of FIG. 4. That is, the relay coil in timer 1 designated a1 will operate the contacts designated A1 in FIG. 4, the relay coil A2 of the timer 2 will operate the contacts a2, a2' as so indicated in FIG. 4, etc. The watt transducer coils shown in FIG. 4 are designated W1 through W6 and have corresponding contacts operated thereby indicated similarly w1, w1', w2, w2', w3, w3' etc. In FIG. 4, the feeder preset trip relay coils are designated F1, F2, F3 etc., with the contacts operated thereby being designated correspondingly f1, f1', f2, f2', f3, f3' etc. The watt transducer relay coils W1, W2, etc. and the associated contacts w1, w1', w1'', w2, w2', w2'', etc. correspond to the transducer switching circuits of FIG. 1, and the feeder preset trip relay coils F1 through F6 and associated contacts f1, f1', f1'', f2, f2', f2'' etc. correspond to the feeder preset trip relay circuits of FIG. 1 and FIG. 2. Diodes D1 through D6 are connected respectively across each of the coils F1 through F6 to protect the contacts associated with each of the coils whenever the coils are deenergized.

Assume initially that none of the feeder transducers 48, 50 or 52 have a potential input applied thereto and therefore provide no output voltages V1, V2 or V3. Assume further that a "shed" condition exists at the input 20 to the comparing and time delay circuitry 70 as shown in FIG. 1 and in FIG. 2. That is, assume that the voltage $V_r$ at the "shed" lead 20 is more positive than voltage $V_b - V_{cg}$ appearing at the "save" lead 37. With a "shed" condition existing on lead 20, the comparator 132 will provide an output at lead A which will cause the shed-save flip-flop 134 to provide an output at D. This will then disable timers 1, 3, 5 and 7, all of which have D inputs. Under such conditions with no output at C, this will permit timers 2, 4, 6 and 8 to time out in the absence of an output from the odd-even flip-flop 136. For the purpose of explanation, assume that the odd-even flip-flop 136 has no output at lead E and an output at lead F. The output at lead F will cause timers 5, 7, 6 and 8 to be disabled while timers 1, 3, 2 and 4 will not be disabled which have E inputs applied thereto. The timers 1 and 3 were disabled by the D input from the shed-save flip-flop 134; therefore, the only timers which do not have inputs applied thereto are timers 2 and 4. As previously mentioned, timer 2 is set to have a time delay for timing out approximately one-half that of timer 4. When timer 2 times out, it activates with a pulse of current the relay coil A2 associated therewith. The activation of the relay coil A2 causes contacts a2 and a2', which are normally open, to close (see FIG. 4). The closing of the bottom set of contacts a2 completes a circuit from a terminal T3, to which a source of positive direct potential is connected, through the contacts a2, the normally closed contacts w2, to the watt transducer relay W1 to ground. The relay coil W1 is selected to be associated with the V1 transducer 48 of FIG. 1. The energization of the relay winding W1 causes the normally open contacts w1 to close and to maintain a conductive path to the coil W1 through the contacts w1, the normally closed contacts w3' and a1 to terminal T3. Once the pulse from a timer has connected, the associated coils A1, A2, etc. will be deenergized and the associated contacts a1, a1', a2, a2', etc. will return to their normal open or closed position.

The closing of the contacts w1 in series with the coil W1 corresponds to the closing of the transducer switching circuit 56 which inserts the V1 transducer 48 into the system so that it provides an output voltage V1 to be subtracted from the tie line transducer output voltage $V_t$. This then provides the difference of these voltages as the voltage $V_r$ on the lead 20 at the input of the comparing, and time delay circuitry 70.

The closing of the top set of contacts a2' completes a circuit to the feeder preset trip relay coil F1. This circuit is completed from the terminal T3, through the now closed contact a2', the normally closed contact f2, and the relay coil F1 to ground. The energization of the coil F1 causes the contact f1 which is normally open to be closed. A current is then maintained to the coil F1 through the contact f1, the normally closed contact f3, the normally closed contact a3 to the terminal T3. Once the contacts a2 and a2' reopen the coil F1 will thus still be energized. The closing of the contact f1 in series with the coil F1 corresponds to the closing of the feeder preset trip relay circuit 111 of FIG. 1. The closing of the contact f1 establishes the preset condition of the dropping of the feeder 1 in case of a tie line failure.

When the introduction of the voltage V1 from the V1 transducer 48 is subtracted from the total tie line power voltage $V_t$, and if it does not make the voltage $V_r$ at lead 20 less positive than the voltage at lead 37—that is, it does not cause the inputs to the comparator 132 to change from a "shed" to a "save" condition—the timer 4 will then time out. The timing out of timer 4 causes an output to appear at lead G at the input of the odd-even flip-flop 136. This will cause the odd-even flip-flop 136 to reverse its output state so that an output will now appear at the lead E and no output will appear at the lead F. An output a E disables the timers 2 and 4, while no output at lead F and with no output at lead C of the shed-save flip-flop 134 permits timers 6 and 8 to begin timing out. All of the other timers except 6 and 8 are inoperative.

When timer 6 times out, it activates a relay coil A6, which, referring to FIG. 4, causes the normally open contacts a6 and a6' to close. The closing of the lower contact a6 completes a circuit to the watt transducer relay coil W2, the circuit being provided from the terminal T3, through the lower closed contact a6, the previously closed contact w1', a normally closed contact w3, to the relay coil W2 to ground. The energization of the relay winding W2 causes the contacts w2 associated therewith to close. An energizing circuit is thus maintained to the coil W2 after the opening of the constant a6 through the contacts w2', the normally closed contacts w4, and the normally closed contact a5 to the terminal T3. The energization of the coil W2 activates the transducer switching circuit 60 and inserts the W2 transducer 50 into the circuit to provide an output voltage V2 which is added to the output voltage of the transducer V1.

A circuit is also completed with the closing of the upper contacts a6' to energize the feeder selector trip circuit relay coil F2. This circuit is provided from the terminal T3, the closed contacts a6', the previously closed contacts f1', the normally closed contacts f3' to the coil F2. This corresponds to the closing of the feeder preset trip relay circuit 112 associated with the V2 breaker 44. This then presets the feeder 2 to be dropped from the system in case of a utility tie line failure. The coil F2 will remain energized after the contacts a6' reopens since a circuit is completed thereto from the terminal T3, and contacts a7, f4, f2'.

Assume the insertion of the output of the V2 transducer of the output voltage V2 into the loop supplying the lead 20 of the comparing and time delay circuitry 70 causes the system to change from a "shed" state to a "save" state, with the lead 37 positive with respect to the lead 20.

Under these conditions, according to FIG. 2, the comparator 132 will provide an output signal with lead B positive with respect to lead A. This will cause the shed-save flip-flop 134 to change from a "shed" state to a "save" state with an output being provided at C and no output at D. The output being applied at C will be applied to timers 6 and 8 which will turn off the timing operation of these timers. The odd-even flip-flop 136, however, remains in the even state with lead F providing no output and lead E providing an output. With no outputs appearing at lead D at the output of the shed-save flip-flop 134 and no output appearing at the lead F of odd-even flip-flop 136, timers 5 and 7 will begin to time with the other timers being deenergized. When timer 5 times out, it will activate a relay coil A5 therein. In response to the activation of relay coil A5, the normally closed contact a5 in FIG. 4 will be opened. This will then open the circuit for the watt transducer relay coil W2 to deenergize it. With the contacts a5 open, the circuit which had previously been completed from the terminal T3 through the contacts a5, the contacts w4 and the previously closed contacts w2 to ground will be opened. It should be noted, however, that the feeder preset trip relay coil F2 will remain energized since a circuit will still be completed therethrough from the terminal T5 through the normally closed contact a7, the normally closed contact f4, the now closed contact f2' to the coil F2 and back to ground.

If the removal of the watt transducer V2 and its corresponding, output voltage V2 from the lead 20 causes a "shed" signal to appear at the lead 20, then the shed-save flip-flop 134 will revert to the state with an output being provided at lead D and no output at the lead C. This will start the timing of timers 6 and 8 again. When timer 6 times out, it pulses the A6 relay coil therein to close contacts a6 and a6' in FIG. 4, which causes watt transducer coil W2 to be reenergized and held in due to the closing of the contact w2. The closing of the top contact a6' also causes a circuit to be completed to the feeder preset trip circuit relay coil F2, but, as previously explained, the contacts associated with the coil F2 have previously been picked up and sealed in. Under the above-described conditions, the circuit of FIG. 4 will have reached a balance point and the V2 watt transducer 50 associated with the coil W2 will switch between being energized and being deenergized, with the watt transducer output V2 periodically, in response thereto, being inserted and taken out of the circuit. It should be noted, however, that the trip circuit controlled by the coil F2 will remain in the circuit and be preset to drop the feeder 2 from the local system in case of a power line failure.

Assume now that after timer 5 had timed out, that the deenergization of watt transducer coil W2 and the taking out of the associated V2 transducer 50 out of the loop 20, did not change the input to the comparator 132 from a "save" to a "shed" condition but rather maintained a "save" condition. With a "save" condition still maintained at the input of comparator 132, timer 7 would continue to time out and upon timing out would pulse a coil A7 therein. The pulsing of coil A7 would cause a normally closed pair of contacts a7 to open, which being in the circuit path of the coil F2, would cause this coil to be deenergized. This would then cause the contacts associated with the coil F2, that is contacts f2 and f2', to revert to their normally open position, which would correspond to the feeder circuit 2 being saved from being shed in case of a utility power line failure. This would correspond to the opening of the switching circuit 112 as shown in FIG. 1.

As shown in FIG. 2, timer 7 also provides an output pulse via lead H to the input of the odd-even flip-flop 136 which causes the flip-flop 136 to change to its odd state with no signal appearing at the output lead E and a signal appearing at the output lead F. With an output appearing at lead F, timers 5, 7, 6 and 8 will be deenergized by the F output and timers 2 and 4 deactivated due to the "save" output at lead C of the shed-save flip-flop 134. Therefore, timers 1 and 3, which are supplied by leads D and E which have no output appearing thereon will begin to time.

After timer 1 has timed out, the coil A1 associated therewith will be pulsed to open the normally closed contacts a1 as shown in FIG. 4. The opening of contacts a1 deenergizes the watt transducer relay coil W1 thereby taking the V1 watt transducer 48 out of the circuit. The feeder preset trip relay circuit associated with the coil F1, however, will remain in the circuit at this time. If after the V1 transducer voltage V1 is taken out of the lead 20, the input to the comparator at lead 20 changes to a "shed" condition. The shed-save flip-flop 134 would change to have an output at lead D to deactivate timers 5 and 7. With no output appearing at lead C of the shed-save flip-flop 134 and no output appearing at lead E, the inputs of timers 2 and 4, these timers 2 and 4 would begin to time out. After the timer 2 had timed out energizing coil A2, the contacts a2 and a2' associated therewith would close to energize the coil W1 associated with watt transducer 48 to reinsert the voltage V1 into the lead 20. If then the input to the comparator 132 changed to its "save" state, the process previously described with the timers 1 and 3 would repeat to take out the V1 transducer 48 from within the circuit. A balance point would thus be reached with the V1 transducer 48 being inserted and taken out of the circuit in response to the energization and deenergization of the coil W1.

Assume under increased local load conditions in the feeder 1 circuit that with the V1 transducer in the circuit, a "shed" condition is still maintained at lead 20 to comparator 132. Thus, after timer 2 had timed out to energize transducer coil W1 and a "shed" signal still appeared on lead 20, the timer 4 would then time out to provide an input at lead G to change the odd-even flip-flop 136 to its even state with no output at lead F and an output at lead E. With no outputs appearing at F and C, timers 6 and 8 would begin to time out. The timing out of timer 6 would cause contacts a6 and a6' to close with the subsequent energization of watt transducer coil W2 and also the energization of feeder preset trip relay circuit coil F2. The energization of the coil W2 would insert the V2 transducer 50 having a voltage output V2 into the lead 20. If the insertion of the V2 transducer into the lead 20 causes a "save" condition to exist at lead 37 at the input of the comparator 132, the timer 8 would be prevented from timing out. The shed-save flip-flop 134 having no output appearing at the lead D thereof timers 5 and 7 would be permitted to time out. The timing out of timer 5 activates coil A5 and causes the contacts $a5$ to open to deactivate the watt transducer coil W2. The system then reaches a balance state with the W2 coil being activated and deactivated as previously described.

If, however, when the timer 6 timed out, a "shed" condition still existed with the insertion of the V2 transducer 48 into the lead 20, the timer 8 would time out to apply an input at 8 to the odd-even flip-flop to change it to its odd state whereby lead E would have no output and lead F would have an output. This would cause timers 2 and 4 to begin timing when timer 2 had timed out and the relay coil A2 therein would cause contacts $a2$ and $a2'$ to close thereby completing a circuit to the watt transducer coil W3 through the now closed contacts $w2''$ and the normally closed contacts $w4'$. The contacts $w3$ would close in response to the energization of coil W3 and would provide a path therethrough along with contacts $w5$ and $a1$ to the terminal T3 to keep coil W3 energized. A circuit would also be completed through the contacts $a2'$, the closed contacts $f2$ and the normally closed contacts $f4'$ to energize the coil F3 and preset the V3 breaker 46 of the feeder 3 to be dropped from the circuit in case of a utility power line failure. The energization of the W3 coil inserts the V3 transducer 52 into the lead 20 with the voltage output V3 being added to the output voltages V1 and V2 of the V1 and V2 transducers respectively.

If with the addition of the voltage V3 in the lead 20, a "shed" signal still appeared on the lead 20, additional watt transducer relay coils W4 and if necessary W5, etc. would be inserted into the loop 20 until a "save" signal was obtained. At the time a "save" signal is reached at the lead 37, the last inserted watt transducer relay would be alternately energized and deenergized to insert and take out of the loop 20 the associated watt transducer. The last previously inserted feeder preset trip relay circuit, however, would be maintained in the circuit until a "save" signal appeared at the lead 37 with the last inserted watt transducer out of the circuit. At this time then the last inserted trip preset circuit relay coil would be deenergized to eliminate the presetting of the associated breaker and feeder line.

At the balance point of the system, a "save" signal is applied at lead 37 of the comparing and time delay circuitry 70 with the last inserted watt transducer connected in the circuit including the lead 20, while a "shed" signal is applied to the lead 20 with the watt transducer not connected in the circuit in the lead 20.

It can thus be seen that the apparatus as described will maintain itself in a balance point until the power supplied to the feeder associated with the last inserted watt transducer is large enough to cause a "shed" signal to appear at the lead 20 with that watt transducer in the circuit. This will cause the next watt transducer to be inserted in the circuit and the associated feeder preset trip relay circuit to be preset for the next feeder line. Alternately, with the last picked up watt transducer out of circuit, a "save" signal appearing at the lead 37 will cause the associated feeder preset trip circuit not to be preset, with the system reaching a balance point with the next lower in preference watt transducer being inserted and taken out of the lead 20. The alternate "save" and "shed" signals thereby indicate a balanced condition.

It can thus be seen that the balance point of the system depends upon the individual loads being carried by the respective feeders 1, 2, 3, etc. The picking up or dropping of the watt transducer and feeder preset trip circuit relays depends upon the magnitude of loads being supplied and is independent of any predetermined bandwidth of power before a feeder is preset to be shed from the local system. The amount of power bandwidth required to preset a given feeder line for shedding in case of a power line failure is thus dependent upon the amount of power being drawn by the feeder lines themselves.

Although the present invention has been described with a certain degree of particularity, it should be understood that the present disclosure has been made only by way of example and that numerous changes in the combination and arrangement of the parts, elements and components can be resorted to without departing from the scope and spirit of the present invention.

I claim as my invention:

1. In load computing and shedding apparatus for use in a local system receiving power from external and internal generating sources and operative to drop load circuits from the local system in case of external power interruption, the combination of:
    external transducer means for providing external signals indicative of the power being supplied externally;
    capacity means for providing save signals indicative of the excess local power supplying capacity available in case of an external power interruption;
    a load circuit transducer means adapted to provide load signals indicative of the power being supplied to each of a plurality of load circuits;
    switch means associated with each of said load circuit transducer means selectively operative in response to sampling signals to permit said circuit transducer means to provide said load signals for the respective load circuit;
    preset means for presetting which load circuits are to be shed in case of external power interruption in response to preset signals;
    means for providing shed signals indicative of the difference between said external signals and the sum of selected of said load signals; and
    control means for providing said sampling signals and said preset signals in response to said shed and said save signals so that enough load circuits are preset to be shed from the local system in case of external power interruption so as not to exceed the excess local power supplying capability.

2. In the apparatus of claim 1 wherein:
    said control means being operative to provide said sampling signals and preset signals to said switching means and said preset means until a predetermined relationship is established between said shed and save signals, said predetermined relationship being indicative that a sufficient number of load circuits have been preset to be shed in case of an external power interruption.

3. In the apparatus of claim 2 wherein:
    said apparatus reaches a balance point with a first predetermined relationship existing between said shed and save signals with the last selected load circuit transducer means providing load signals therefrom, and a second predetermined relationship existing between said shed and save signals with the last selected load circuit not providing load signals therefrom.

4. In the apparatus of claim 1 wherein:
    shed and save states in said apparatus being respectively defined when a first or a second relationship exists between said shed and save signals, a shed state being indicative that additional load circuits must be preset and a save state indicating that too many main load circuits have been preset to be shed in case of an external power interruption,
    said control means including means to sense said first and second relationships and in response thereto provides the desired switching and preset signals to preset only enough load circuits as to not exceed the local excess power supplying capacity.

5. In the apparatus of claim 4 wherein:
    a balanced state being defined when said first and second relationships alternately exist between said shed and save signals, a shed state existing when the last selected local transducer means provides load signals in response to sampling signals from said control means and a save state existing when the last selected local transducer means does not provide load signals therefrom, the load circuit associated with the last selected local transducer means being preset to be shed from the system in case of an external power interruption.

6. In the apparatus of claim 1 wherein:
said control means including:
first logic means for providing first logic signals in response to the relationship of said shed and save signals with respect to each other,
timing circuit means including a plurality of timing circuits, predetermined ones of said timing circuits providing said sampling signals, said preset signals and timing signals in response to said first logic signals and second logic signals, and
second logic means in response to said timing signals for providing said second logic signals.

7. In the apparatus of claim 4 wherein:
said control means including:
first logic means for providing first and second signals in response to said first and second relationships of said shed and save signals respectively;
timing circuit means including a plurality of first timing circuits and a plurality of second timing circuits, said plurality of first and second timing circuits being responsive to said first and second signals respectively and with predetermined ones of said plurality of first and second timing circuits being responsive to third and fourth signals to provide said sampling signals, said preset signals and timing signals from predetermined timing circuits thereof,
second logic means responsive to said timing signals for providing said third and fourth signals to the predetermined ones of said plurality of first and second timing circuits,
predetermined ones of said plurality of first and second timing circuits being operative to time out and provide said sampling, said preset and said timing signals when the signals applied thereto have a predetermined relationship with respect to each other.

References Cited

UNITED STATES PATENTS 3,300,648   1/1967   Rockefeller et al. _____ 307—29

ROBERT K. SCHAEFER, *Primary Examiner*.

H. J. HOHAUSER, *Assistant Examiner*.